Patented Feb. 27, 1951

2,543,209

UNITED STATES PATENT OFFICE 2,543,209

MANUFACTURE OF CHOCOLATE

André Louis Verdier, Paris, France

No Drawing. Application July 26, 1949, Serial No. 106,980. In France August 9, 1948

1 Claim. (Cl. 99—23)

According to the ordinary process used for manufacturing chocolate, cocoa beans are successively pounded and more and more finely ground, so as to obtain a viscous paste which contains cocoa, cocoa-butter and cellulosic wasteproducts. The mass is mixed with a suitable quantity of sugar in order to obtain chocolate and this latter is submitted to a crushing and to a mechanical kneading which is termed conchage.

In this usual process, the sugar is moistened only with the volume of liquor corresponding to the mass of cocoa-beans used and besides the viscosity of this liquor is great, owing to presence of solid material in suspension. Consequently it is very often impossible to sufficiently spread sugar into the whole mass and rather great grumes are formed to the detriment of the quality of chocolate.

The present invention has for its purpose to avoid these drawbacks and to obtain ease of manufacture, with an uniform distribution of sugar, the composition and the fineness being exactly those which are desired.

According to this invention, after grinding the cocoa-beans, the liquid mass is squeezed in order to extract the greatest part of cocoa-butter, while keeping a residue of pasty consistance. To the thus extracted cocoa-butter is added finely ground sugar, the mixing being made above 70° C. with a large excess of cocoa-butter which is afterwards eliminated by means of squeezing and the remaining sugared juice is incorporated into the pasty mass previously obtained as residue in extraction of cocoa-butter.

In practice, the process according to the invention may be carried out in the following manner.

The mass resulting from a suitable pounding of cocoa beans is introduced in a centrifugal machine or in a filter-press or in any equivalent apparatus so as to undergo a squeezing which eliminates from the mass a great proportion of the cocoa-butter contained therein, the remaining fraction being sufficient to maintain the residue in a pasty condition.

The cocoa-butter which has been extracted in this operation is mixed with sugar powder, the fineness of which is that desired for the final product.

In order to facilitate the dispersion of sugar, an excess of cocoa-butter is used and, if necessary, a supplemental amount of external origin is added to the cocoa-butter resulting from the preceding operation.

In order to obtain uniform mass, the sugar and the cocoa-butter are preferably mixed in a diluting and homogenizing apparatus, at a temperature of 70° C. at least.

The dispersion of sugar may be increased if a small percentage of lecithin is added to the cocoabutter.

To bring back the sugared liquor to the proportion of sugar which has been chosen, this liquor is partially squeezed by means of a centrifugal machine or a filter-press or any similar apparatus.

The sugared liquor is introduced in the paste obtained in the extraction of cocoa-butter. For this operation any suitable mixing or homogenizing apparatus may be used. A very homogeneous chocolate is thus obtained, and it may be moulded in the usual manner.

The process according to the invention procures important advantages. It dispenses with any limitation in the fineness of incorporated sugar.

Besides, as the sugar is introduced in cocoabutter without the presence of dry material, the cocoa-butter may be strongly heated so as to facilitate the mixing.

During the treatment of sugared cocoa-butter, it is easy to eliminate the particles of sugar, the size of which exceeds a predetermined value.

The cocoa and cocoa-butter being separated, each of them may be treated independently in order to improve its quality. Particularly suitable substances may be incorporated in the cocoa and cocoa-butter so as to modify their odor or their taste.

I claim:

A process for the manufacture of commercial chocolate from crushed cocoa nibs comprising extracting the greater part of the cocoa butter content from the mass of crushed nibs, leaving a pasty residual mass, mixing the extracted cocoa butter with finely crushed sugar and with a large volume of additional cocoa butter at a temperature of at least 70° C., squeezing the cocoa butter-sugar mixture to bring the sugar content of the mixture to a desired value and then mixing a desired proportion of the resulting cocoa buttersugar mixture with the pasty residual mass.

ANDRÉ LOUIS VERDIER.

REFERENCES CITED

The following references are of record in the file of this patent:

UNITED STATES PATENTS

| Number | Name | Date |
|--------|------|------|
| 731,563 | Haley | June 23, 1903 |